United States Patent [19]

Dilling

[11] Patent Number: 4,486,346
[45] Date of Patent: Dec. 4, 1984

[54] COLOR REDUCTION PROCESS FOR NON-SULFONATED LIGNIN

[75] Inventor: Peter Dilling, Isle of Palms, S.C.

[73] Assignee: Westvaco Corporation, New York, N.Y.

[21] Appl. No.: 547,119

[22] Filed: Oct. 31, 1983

[51] Int. Cl.³ ............................................. C07G 1/00
[52] U.S. Cl. .................................................... 530/501
[58] Field of Search ........................................ 260/124

[56] References Cited

U.S. PATENT DOCUMENTS

| | | | |
|---|---|---|---|
| 2,525,433 | 10/1950 | Voet | 106/30 |
| 2,680,113 | 6/1954 | Adler et al. | 260/124 |
| 2,690,973 | 10/1954 | Voet | 106/20 |
| 3,503,762 | 3/1970 | Remer | 106/23 |
| 3,672,817 | 6/1972 | Falkehag et al. | 8/79 |
| 3,763,139 | 10/1973 | Falkehag | 260/124 R |
| 3,769,272 | 10/1973 | Hintz | 260/124 R |
| 3,865,803 | 2/1975 | Falkehag | 260/124 A |
| 4,184,845 | 1/1980 | Lin | 8/34 |

OTHER PUBLICATIONS

K. V. Sarkanen, et al., "Lignins", (1971), 466-469.

Primary Examiner—Delbert R. Phillips
Attorney, Agent, or Firm—Terry B. McDaniel; Richard L. Schmalz

[57] ABSTRACT

Non-sulfonated lignin color reductions of over 90 percent, and in some cases as high as 95 percent, are achieved by a three-step process involving (1) methylolating or crosslinking the lignin, (2) the blocking of phenolic groups on the lignin molecule with blocking agents followed by (3) oxidation with chlorine dioxide. The light colored lignin dispersants produced by the invention process exhibit very low staining and low azo dye reduction, good heat stability, dye grinding efficiency, and dispersion stability.

9 Claims, No Drawings

COLOR REDUCTION PROCESS FOR NON-SULFONATED LIGNIN

BACKGROUND OF THE INVENTION

1. Field of the Invention

This invention relates to improved lignin surfactants and their use as dispersants in dyestuffs and inks. More particularly, this invention relates to non-sulfonated lignin surfactants having reduced staining characteristics produced by a three-step process involving (1) methylolating or crosslinking the lignin, (2) blocking the phenolic functions followed by (3) oxidative reactions.

2. Description of the Prior Art

Lignins have long been recognized for their excellent dispersant properties, but their dark color has excluded them from certain uses. For example, lignin may not be used as a textile dye dispersant with many fabrics since this may produce slight staining or darkening of sensitive shades. When water-soluble, sulfonated alkali lignin (from the kraft or soda pulping processes) or lignosulfonate (from the sulfite pulping process) is used as a dye dispersant, it is ball-milled with a dye cake and the mixture is then used for dyeing natural or synthetic fibers. During the dyeing process, some of the lignin can absorb onto the fabric fibers distorting the true color of the dye. The magnitude of the problem depends on the color of the lignin material.

Also, lignins are used in inks and, in particular, printing inks, as disclosed in U.S. Pat. Nos. 2,525,433 and 2,690,973. Unlike textile dye systems which are generally aqueous and require water-soluble dispersants, ink formulations generally rely on organic solvents; and water-solubility may not be required. Therefore, alkali lignins may be employed in their natural, or non-sulfonated, form and lignosulfonates which have been subjected to desulfonation may be used. In standard ink formulations, lignin color is not objectionable. In fact, U.S. Pat. No. 3,503,762 teaches an ink comprising a lignin product as a color constituent thereof rather than as a dispersant, vehicle or water loss reducing agent. However, advance printing and ink technology have increased the use of colored inks which can be deleteriously affected by the dark color of lignin dispersants.

Therefore, a need exists for a light colored lignin dispersant which can be employed in vat or dispersed dyestuffs for textiles, as well as in inks, particularly colored inks.

Lignin in its natural state is almost colorless. The cause of the brown color of alkali lignins (from the kraft and soda pulping processes) and lignosulfonates (from the sulfite pulping process) and the mechanism for the formation of chromophores during the pulping process are not completely known, although numerous suggestions have been made over the years.

The majority of chromphoric structures in alkali lignins and lignosulfonates appear to be some sort of conjugated systems involving quinonoid and side-chain double bonds. These conjugated systems may be cleaved by some oxidative processes or saturated by reductive processes to achieve some reduction of lignin color. Reductive processes change quinones to colorless catecholic structures which, however, are not stable under the influence of oxygen (air) and sunlight.

On the other hand, oxidative processes convert quinonoid structures to colorless aliphatic acids. The oxidative process also causes cleavage of unsaturated carbon-carbon bonds in the propanoid side chains of lignin molecules. By doing so, some extensively conjugated systems (chromophores) are destroyed, resulting in some reduction of lignin color. An advantage of the oxidative process is the fact that colorless end-products in oxidation reactions are stable and chromophores are not reformed thereof. However, uncontrolled oxidative conditions invite random destruction of lignin aromaticity and concurrently give rise to the formation of color bodies. For example, colored quinonoid moieties are produced in lignin by the following oxidative demethylation pathway:

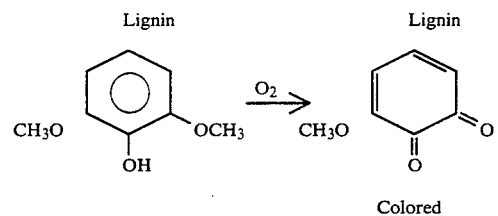

It has been shown that the color of lignin may be reduced to some degree by blocking the free-phenolic hydroxyls in lignin. Several blocking methods have been set forth, such as in U.S. Pat. No. 3,672,817 where the lignin color was reduced as much as 44% by blocking the phenolic hydroxyl with an alkylene oxide or a halogen-containing alkyl alcohol. In U.S. Pat. No. 3,763,139, lignin color was reduced by blocking the phenolic hydroxyl with reagents, such as chloromethane sulfonate, chloromethane phosphonate, 2-chloroethanol and the like. In U.S. Pat. No. 3,769,272, lignin color was reduced by blocking with 3-chloro-2-hydroxypropane-1-sulfonate. And in U.S. Pat. No. 3,865,803, the phenolic hydroxyl was blocked with an agent of the type $X(CH_2)_nY$, where X is a halogen, activated double bond, epoxide ring, or a halohydrin, Y is a sulfonate, phosphonate, hydroxyl, sulfide, or a secondary or tertiary amine, and (n) is an integer from 1 to 5. Finally, U.S. Pat. No. 4,184,845 discloses a two-step process for reducing the color of lignin by first blocking the phenolic hydroxyl and then oxidizing the blocked lignin by subjecting to air, molecular oxygen or hydrogen peroxide.

Also, in commonly assigned U.S. patent application Ser. No. 438,391 of which the inventor is a co-inventor, a process is disclosed for reducing the color of sulfonated lignins and lignosulfonates by a two-step process of first blocking 80% of the lignin's phenolic functions followed by oxidizing the blocked lignin with chlorine dioxide.

Although each of the above methods gave some reduction of the color of an alkali lignin or lignosulfonate, none have reduced the color to the extent of the process of this invention.

SUMMARY OF THE INVENTION

It has been found that non-sulfonated lignin color reductions of over 90 percent, and in some cases as high as 95 percent, are achieved by a three-step process involving (1) methylolating or crosslinking the lignin, (2) the blocking of phenolic groups on the lignin molecule with blocking agents such as ethylene oxide and propylene oxide followed by (3) oxidation with chlorine dioxide. The light colored lignin dispersants produced by the invention process exhibit very low staining and low azo dye reduction, good heat stability, dye grinding efficiency, and dispersion stability.

DESCRIPTION OF THE PREFERRED EMBODIMENT

Lignin is a polymeric substance of substituted aromatics found in plant and vegetable tissues associated with cellulose and other plant constituents. In the pulp and paper industry, lignin-containing materials such as wood, straw, corn stalks, bagasse and other vegetable and plant tissues are processed to recover the cellulose fibers or pulp. The residual pulping liquors containing the lignin as a by-product is thus one of the major sources of lignin. The lignin recovered from the sulfite process is water-soluble lignosulfonate. The alkali lignin recovered from the kraft or soda process is not sulfonated and, in its acid form, is insoluble in water. However, alkali lignin has been subsequently sulfonated by various methods to produce useful dispersants. One method of sulfonating kraft lignin is taught by Adler et al. in U.S. Pat. No. 2,680,113. Likewise, lignosulfonates have been subjected to desulfonation processes. For the purpose of this invention, non-sulfonated lignin refers to alkali lignin which has not been subjected to sulfonation and lignosulfonate from sulfite pulping liquors which has been subjected to desulfonation.

The invention lignin color reduction process consists of three essential chemical processing steps: (1) methylolating or crosslinking the lignin, (2) etherification (blocking) of phenolic groups on the lignin, and (3) bleaching of the blocked lignin using chlorine dioxide ($ClO_2$) as the oxidative reagent.

Methylolation or Crosslinking

In non-sulfonated lignins, the position adjacent to the phenolic hydroxyl group on the aromatic ring is not occupied. Upon subjecting the lignin to blocking reactions followed by oxidation, a greater amount of bleaching ingredients ($ClO_2$ and NaOH) are required over that needed for sulfonated or sulfomethylated lignins to achieve equivalent color values. The added reactant levels result in larger amounts of undesired inorganic matter. Also, color stability problems result upon extended storage of non-sulfonated lignins which have been subjected to conventional color reduction treatments.

It has been discovered, however, that by reacting the non-sulfonated lignin in an aqueous slurry of from 1% to 60% solids with formaldehyde prior to the steps of blocking the phenolic hydroxyl groups and bleaching reduces significantly the bleaching ingredients required and results in satisfactory levels of inorganic matter for applications such as in printing inks. Also, the formaldehyde treatment prior to the blocking and bleaching reactions produces improved color stability. The formaldehyde treatment can result in either methylolation or crosslinking of the lignin molecule. The product of the reaction is dependent on the reaction temperature. A reaction temperature up to 80° C. will produce methylolated lignin, and a reaction temperature above 80° C. will result in crosslinking. In either case, the ortho position on the aromatic ring becomes occupied; and the product of the subsequent color reduction steps is improved as a result.

Methylolation occurs according to the following reaction:

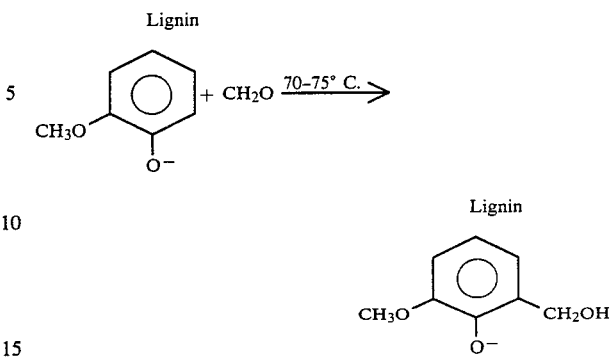

From 0.1 to 5.0 moles of formaldehyde per 1000 grams of lignin may be used, but 2.5–3.0 moles are preferred to minimize degradation reactions. The desired temperature of methylolation is approximately 70°–75° C. Should the reaction temperature exceed 80° C., crosslinking takes place according to the following reaction:

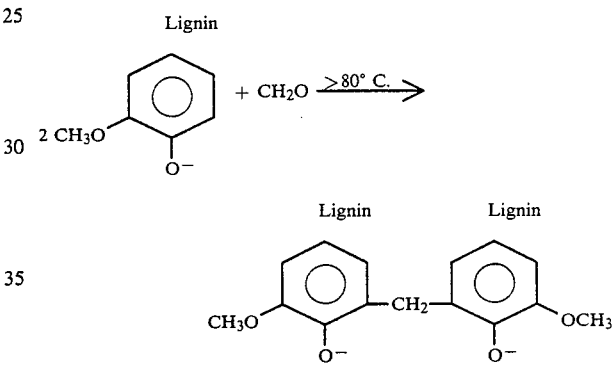

Etherification

Subsequent to methylolation or crosslinking, the blocking of the phenols is accomplished with ethylene oxide or propylene oxide, to maintain adequate solubility of the lignin. The introduction of hydrophobic blocking reagents, such as dimethylsulfate or diethylsulfate, or crosslinking reactants, such as epichlorohydrin, in the absence of one or more hydrophilic blocking agents caused lignin precipitation. Combinations of one or more blocking agents may be employed.

The blocking reagent should be reactive enough to block at least 80% of the phenolic functions in the non-sulfonated lignin. Preferably, 90% of the phenolic functions are blocked. Nonionic type reactants such as ethylene oxide reduce the electron resonance of the lignin molecule and were found superior in reducing the electrolyte content when compared to reactants which contain an ionizable end group.

Propylene oxide, as the electrolyte producing compound, however, generates NaOH which is beneficial for the subsequent bleaching step which requires an alkaline pH media anyway. A portion of the sodium is used for the ionization of carboxyl groups which appear during the course of oxidation.

Blocking, to the extent of at least 80% of the available phenols, is necessary to obtain color stable lignin dispersants, as shown by testing at high pH, temperature and pressure. Below this level, color reversion may occur which results in fiber staining and azo dye reduction. Lignin degradation reactions resulting in deterioration of heat stability are also associated with bleaching of partially blocked lignin derivatives under the process conditions. Color stability is best when at least 90% of the available phenols are blocked.

Reaction temperature profiles indicate that the propylene oxide reaction with lignin proceeds equally well at temperatures between 25° C. and 100° C.

The highest levels of blocking of crosslinked lignin have been achieved using 5 moles propylene oxide and 0.2-1.2 moles, preferably 0.5 mole, diethylsulfate per 1000 grams lignin.

Bleaching

Chlorine dioxide is the most efficient oxidation reagent in reducing the color of non-sulfonated lignins under the process conditions. In addition, the color obtained was stable to pH, pressure and temperature, providing that at least 80% of the phenolic hydroxyl groups were etherified prior to the chlorine dioxide application and that the oxidation was carried out at ambient temperatures at a pH of 5-13.

The chlorine dioxide bleaching may be accomplished in either a batch or continuous system. Typically, in either type small scale process the chlorine dioxide is generated by passing a 10% chlorine in 90% nitrogen gas up through one or more columns packed with dry granular sodium chlorite. Chlorine dioxide is formed by the following reaction:

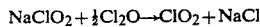

$$NaClO_2 + \tfrac{1}{2}Cl_2O \rightarrow ClO_2 + NaCl$$

In the batch process, the chlorine dioxide gas then enters a lignin containing column at the bottom of the column via a fritted disk, travelling upward and interacting with the 25% solids lignin solution. In a continuous process, the lignin containing column is a packed contacting column and the lignin solution enters the column at the top and travels downward while the chlorine dioxide gas enters the column at the bottom and travels upward. The decolorized lignin product flows out the bottom of the column.

The amount of chlorine dioxide reacted with the lignin may be determined by a two-step process. First, a blank experiment provides information regarding the quantity of chlorine dioxide generated over a given time period using a standardized flow rate of chlorine gas. The amounts collected in several wash bottles are determined by known titration methods. In the second step, the lignin is bleached under the identical conditions used in the blank run. The total quantity of chlorine dioxide generated during the time needed for proper lignin bleaching is thus measured. This figure should correspond to from 0.1 to 8 moles per 1000 grams of lignin, preferably 1 to 3 moles, and most preferably 2.2 moles.

Due to solubility considerations, the pH during the oxidation is maintained initially above pH 11 and gradually allowed to decrease as carboxyl groups are generated, keeping the lignin in solution at the lower pH levels. The solubility, upon bleaching, is very adequate for most current dyestuff related applications. Even at 25% solids concentration, complete solutions at pHs as low as 5.5 can be obtained. Also, the lignins can be purified if needed to be used in salt sensitive applications (printing, for example) by lowering the pH further to approximately 2.5 at which the lignin fully precipitates. After heat coagulation, filtration and a water washing step, the product is dried at this point or redissolved with general hydroxides such as sodium, ammonium or an amine to form their respective salts and then dried.

The invention is illustrated in the following examples.

EXAMPLE 1

As an example of the invention method for decolorizing non-sulfonated lignin, an alkaline slurry (32.85% solids) of kraft pine lignin (Westvaco Corporation's INDULIN ®AT) was reacted with 1.8 moles formaldehyde per 1000 grams lignin for three hours at 70° C. and pH 11. The methylolated lignin was reacted next with five moles propylene oxide at 25° C. by first adding 2 moles propylene oxide and reacting overnight, adding an additional 2 moles the next morning and adding the fifth mole of propylene oxide in the afternoon.

The reaction with propylene oxide achieved blocking of 91.8% of the phenolic functions. The blocked methylolated lignin was then further reacted with 0.25 mole diethylsulfate to result in blocking 93.7% of the phenolic functions.

The blocked lignin product was bleached with chlorine dioxide according to the specification until the light color of the lignin was consistent in the pH range of from 7-10. The light colored lignin was precipitated (by reducing the pH to 2), centrifuged, washed, and heat-dried.

EXAMPLE 2

In this example, the non-sulfonated lignin is crosslinked with two moles formaldehyde followed by blocking with five moles propylene oxide and one mole diethylsulfate which is, in turn, followed by bleaching with chlorine dioxide.

Four hundred (400) grams kraft pine lignin slurry (29.7% solids, 2.2% ash content), containing 116.2 grams lignin, was raised to pH 11 with 50% sodium hydroxide solution and, upon raising the temperature to 95° C., 2 moles of formaldehyde was introduced. The reaction proceeded for 2 hours at 95° C.

After the mixture was cooled to room temperature, 5 moles propylene oxide was added and the reaction allowed to continue overnight. The reaction product was 72% blocked. Thereafter, 1 mole of diethylsulfate was introduced and the reaction continued at 25° C. for two additional days. The crosslinked lignin now had 97% of the phenolic functions blocked.

Bleaching was conducted with chlorine dioxide and, upon precipitation, 70% yield of light colored lignin was obtained.

EXAMPLE 3

In the following non-sulfonated lignin color reduction reaction sequence, samples were taken at various stages to determine blocking efficiencies. Three thousand twenty-nine (3029) grams of kraft pine lignin slurry (31% solids, 1.2% ash) was diluted to 30% solids and 2.8 moles formaldehyde was added (210.6 grams HCHO solution). The pH was adjusted to 11 and the temperature raised to 65° C. and held for 2 hours. Sample No. 1 was taken and the blocking value (B.V.) of the unblocked, methylolated lignin was determined for calculating the efficiencies of subsequent blocking reactions.

The temperature was raised to 95° C. to effect crosslinking and Sample No. 2 was taken. Sample Nos. 3 and 4 were also taken after 15 and 30 minutes, respectively, of reaction time at 95° C. All samples were subsequently blocked with propylene oxide (P.O.) at 25° C. overnight and with 0.5 mole diethylsulfate (DES) at 25° C. the next day. The blocking efficiencies are reported in Table I.

TABLE I

| Sample No. | B.V. | % Blocked |
|---|---|---|
| 1. | 24.5 | |
| +5 M P.O. | 3.18 | 87 |
| +0.5 M DES | 1.01 | 96 |
| 2. +5 M P.O. | 3.14 | 87 |
| +0.5 M DES | 1.40 | 94 |
| 3. +5 M P.O. | 3.11 | 87 |
| +0.5 M DES | 1.23 | 95 |
| 4. +5 M P.O. | 0.84 | 97 |
| +0.5 M DES | 0.84 | 97 |

EXAMPLE 4

Table II, below, presents a comparison of the properties of the light colored non-sulfonated lignin produced by the invention method and commercial sulfonated lignins used as dispersants for dyestuffs and printing inks. The light colored, non-sulfonated lignin exhibits comparable or improved performance in either application.

TABLE II

| Product | REAX ® 85 | REAX ® 83 | Light Colored, Non-sulfonated Lignin |
|---|---|---|---|
| Degree of sulf. | 1.0 | 1.7 | 0 |
| Viscosity pH 7, 25° C. | 175 cps [s.*25%] | 5520 cps [s.*39%] | ~1775 cps [s.*36%]** |
| Solution pH 5% solids | 10.0 | 10.0 | ~4.0 |
| Conductance pH 7, 5% solids | 9200 m mhos | 12400 m mhos | ~3600 m mhos |
| Staining - light reflectance pH 4 lignin:nylon ratio = 1:1 | 50% | 66% | 80% |
| Heat stability pH 5 | | | |
| blue 333 | 31.5 mg | 82.8 mg | 9.9 mg |
| red 1 | 5.0 mg | 9.4 mg | 9.1 mg |
| blue 118 | 2.9 mg | 5.1 mg | 9.3 mg |
| yellow 88 | 2.7 mg | 4.6 mg | 4.9 mg |
| Printing gel vis. pH 7, 8 g lignin:30 g gel | 1500 cps | 1000 cps | 12,200 cps |

® Registered trademark of Westvaco Corporation
*% solids in slurry
**pH 8

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A method for decolorizing non-sulfonated lignin in an alkaline pH media surfactants derived from kraft and sulfite pulping processes comprising the steps of
   (a) reacting the lignin with from 0.1 to 5.0 moles formaldehyde per 1000 grams lignin,
   (b) blocking at least 80% of the lignin's phenolic functions with one or more blocking agents, and
   (c) oxidizing the blocked lignin with 0.1 to 8 moles chlorine dioxide per 1000 grams of lignin.

2. The method of claim 1 wherein from 2.5 to 3.0 moles of formaldehyde are reacted at a temperature of from 70° C. to 75° C.

3. The method of claim 1 wherein from 2.5 to 3.0 moles of formaldehyde are reacted at a temperature above 80° C.

4. The method of claim 2 wherein the lignin is in an aqueous slurry of from 1% to 60% solids and the blocking agents are selected from the group consisting of ethylene oxide, propylene oxide, dimethylsulfate, diethylsulfate and combinations thereof.

5. The method of claim 4 wherein the blocking agents are 5 moles propylene oxide and from 0.2 to 1.2 moles diethylsulfate per 1000 grams lignin and the blocked lignin is oxidized with from 1 to 3 moles chlorine dioxide per 1000 grams lignin.

6. The method of claim 5 wherein at least 90% of the phenolic functions are blocked with 5 moles propylene oxide and 0.5 mole of diethylsulfate per 1000 grams lignin at a temperature of from 25° C. to 100° C., and the blocked lignin is oxidized with 2.2 moles chlorine dioxide per 1000 grams lignin at a temperature of about 25° C.

7. The method of claim 3 wherein the lignin is in an aqueous slurry of from 1% to 60% solids and the blocking agents are selected from the group consisting of ethylene oxide, propylene oxide, dimethylsulfate, diethylsulfate and combinations thereof.

8. The method of claim 7 wherein the blocking agents are 5 moles propylene oxide and from 0.2 to 1.2 moles diethylsulfate per 1000 grams lignin and the blocked lignin is oxidized with from 1 to 3 moles chlorine dioxide per 1000 grams lignin.

9. The method of claim 8 wherein at least 90% of the phenolic functions are blocked with 5 moles propylene oxide and 0.5 mole of diethylsulfate per 1000 grams lignin at a temperature of from 25° C. to 100° C., and the blocked lignin is oxidized with 2.2 moles chlorine dioxide per 1000 grams lignin at a temperature of about 25° C.

* * * * *

UNITED STATES PATENT AND TRADEMARK OFFICE
CERTIFICATE OF CORRECTION

PATENT NO.    :   4,486,346
DATED         :   December 4, 1984
INVENTOR(S)   :   Peter Dilling It is certified that error appears in the above-identified patent and that said Letters Patent is hereby corrected as shown below:

In column 2, lines 12 through 22,

" 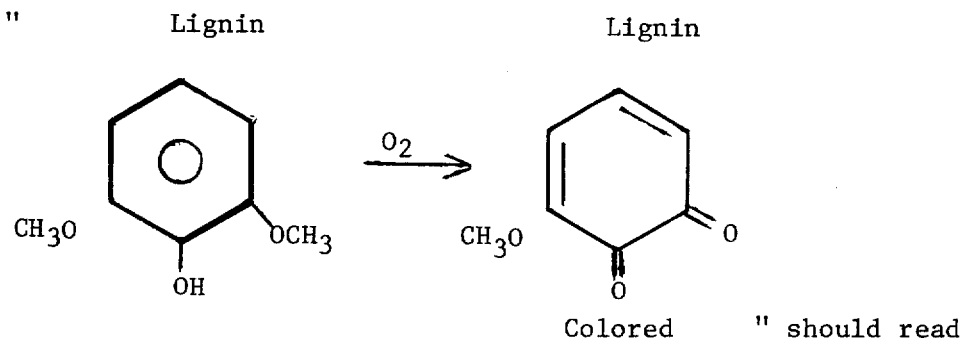 " should read

-- 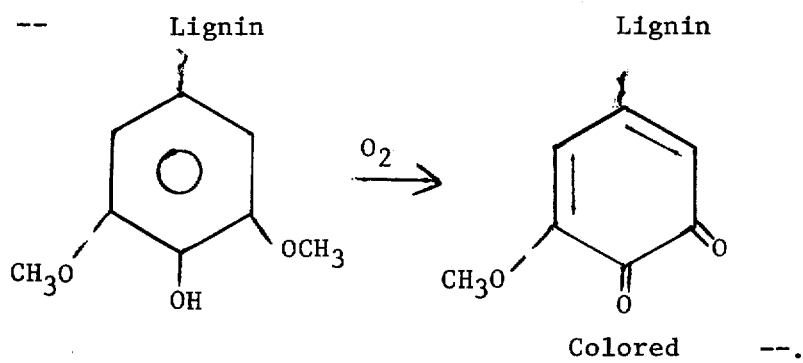 --.

UNITED STATES PATENT AND TRADEMARK OFFICE
CERTIFICATE OF CORRECTION

PATENT NO. : 4,486,346

DATED : December 4, 1984

INVENTOR(S) : Peter Dilling

It is certified that error appears in the above-identified patent and that said Letters Patent is hereby corrected as shown below:

In column 4, lines 1 through 15,

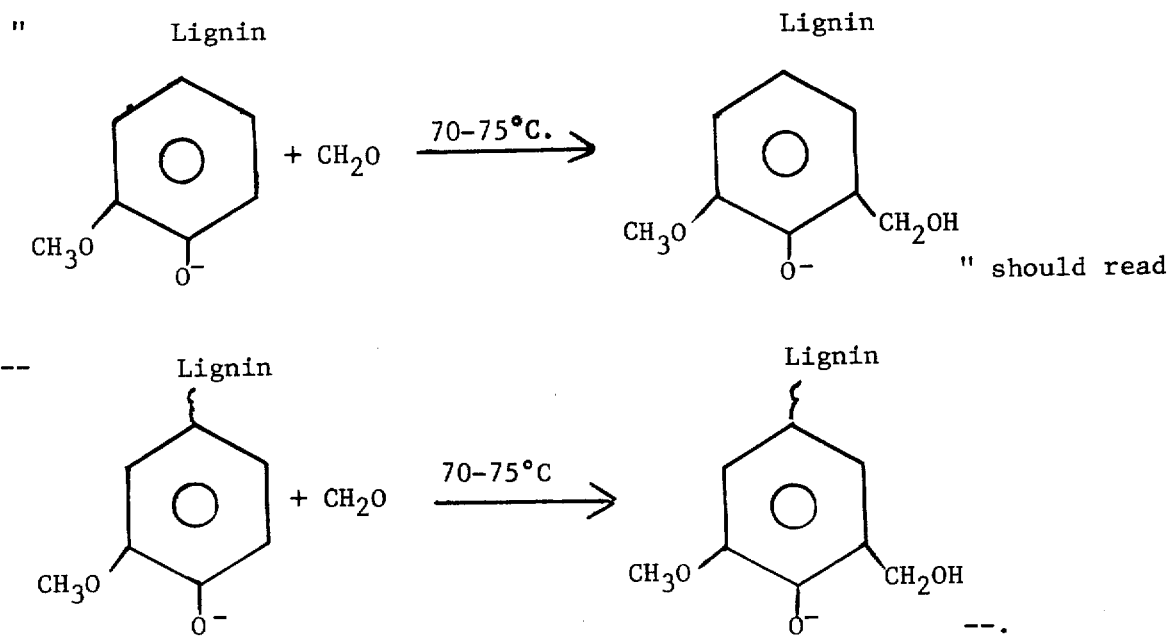

UNITED STATES PATENT AND TRADEMARK OFFICE
CERTIFICATE OF CORRECTION

PATENT NO. : 4,486,346
DATED : December 4, 1984
INVENTOR(S) : Peter Dilling

It is certified that error appears in the above-identified patent and that said Letters Patent is hereby corrected as shown below:

In column 4, lines 25 through 39,

"
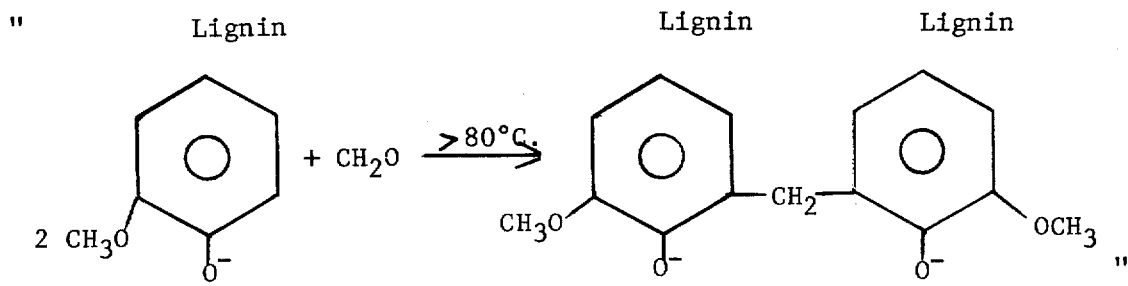

should read

--
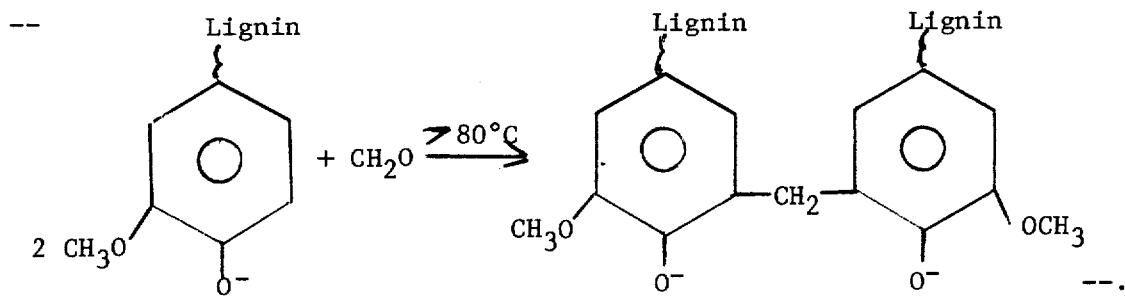
--.

UNITED STATES PATENT AND TRADEMARK OFFICE
CERTIFICATE OF CORRECTION

PATENT NO. : 4,486,346
DATED : December 4, 1984
INVENTOR(S) : Peter Dilling

It is certified that error appears in the above-identified patent and that said Letters Patent is hereby corrected as shown below:

In column 7, lines 27 through 49, TABLE II should read --

TABLE II

| Product | REAX® 85 | REAX® 83 | Light Colored, Non-sulfonated Lignin |
|---|---|---|---|
| Degree of sulf. | 1.0 | 1.7 | 0 |
| Viscosity pH 7, 25°C | 175 cps [s.*25%] | 5520 cps [s.*39%] | ∿1775 cps [s.*36%]** |
| Solution pH 5% solids | 10.0 | 10.0 | ∿4.0 |
| Conductance pH 7, 5% solids | 9200 m mhos | 12400 m mhos | ∿3600 m mhos |
| Staining - light reflectance pH 4 lignin:nylon ratio = 1:1 | 50% | 66% | 80% |
| Heat stability pH 5 | | | |
| blue 333 | 31.5 mg | 82.8 mg | 9.9 mg |
| red 1 | 5.0 mg | 9.4 mg | 9.1 mg |
| blue 118 | 2.9 mg | 5.1 mg | 9.3 mg |
| yellow 88 | 2.7 mg | 4.6 mg | 4.9 mg |

UNITED STATES PATENT AND TRADEMARK OFFICE
CERTIFICATE OF CORRECTION

PATENT NO. : 4,486,346
DATED : December 4, 1984
INVENTOR(S) : Peter Dilling

It is certified that error appears in the above-identified patent and that said Letters Patent is hereby corrected as shown below:

```
Printing gel vis.    1500 cps         1000 cps              12,200 cps
pH 7,
8g lignin:30g gel
```

---

® Registered trademark of Westvaco Corporation
* % solids in slurry
** pH 8 --.

In column 7, lines 60-61, in claim 1, "in an alkaline pH media" should be deleted.

In column 8, line 2, in claim 1, --in an alkaline pH media-- should be inserted after the word "lignin".

Signed and Sealed this

Twenty-fourth Day of September 1985

[SEAL]

Attest:

Attesting Officer

DONALD J. QUIGG

Commissioner of Patents and
Trademarks—Designate